(12) United States Patent
Mohebbi

(10) Patent No.: US 8,447,230 B2
(45) Date of Patent: May 21, 2013

(54) VARIABLE GAIN ANTENNA FOR CELLULAR REPEATER

(75) Inventor: Behzad B. Mohebbi, San Diego, CA (US)

(73) Assignee: Nextivity, Inc., San Diego, CA (US)

(*) Notice: Subject to any disclaimer, the term of this patent is extended or adjusted under 35 U.S.C. 154(b) by 590 days.

(21) Appl. No.: 11/936,040

(22) Filed: Nov. 6, 2007

(65) Prior Publication Data

US 2008/0299897 A1     Dec. 4, 2008

Related U.S. Application Data

(60) Provisional application No. 60/864,570, filed on Nov. 6, 2006.

(51) Int. Cl.
*H04B 7/15* (2006.01)
*H04B 7/185* (2006.01)
*H04B 7/19* (2006.01)

(52) U.S. Cl.
USPC ....... 455/11.1; 455/12.1; 455/13.1; 455/13.2; 455/13.3; 455/13.4

(58) Field of Classification Search
USPC ............ 455/11.1, 13.1, 12.1, 13.2, 13.3, 455/13.4
See application file for complete search history.

(56) References Cited

U.S. PATENT DOCUMENTS

| | | | |
|---|---|---|---|
| 6,188,875 B1 * | 2/2001 | Evans | 455/15 |
| 6,640,111 B1 * | 10/2003 | Shapira | 455/562.1 |
| 6,934,511 B1 | 8/2005 | Lovinggood et al. | |
| 7,398,052 B2 * | 7/2008 | Spirito et al. | 455/18 |
| 7,480,486 B1 * | 1/2009 | Oh et al. | 455/7 |
| 7,526,247 B2 * | 4/2009 | Baker et al. | 455/11.1 |
| 2003/0123401 A1 * | 7/2003 | Dean | 370/318 |
| 2003/0143948 A1 | 7/2003 | Han et al. | |

(Continued)

FOREIGN PATENT DOCUMENTS

| | | |
|---|---|---|
| EP | 1 615 354 A2 | 1/2006 |
| JP | 01 004122 | 1/1989 |

(Continued)

OTHER PUBLICATIONS

International Search Report for related patent PCT/US2007/083831 performed by International Searching Authority/EP on Jul. 7, 2008.

(Continued)

*Primary Examiner* — Bobbak Safaipour
(74) *Attorney, Agent, or Firm* — Mintz Levin Cohn Ferris Glovsky and Popeo, P.C.

(57) ABSTRACT

A cellular repeater and method of operating a cellular repeater are disclosed. The cellular repeater includes a variable-gain donor antenna adapted to communicate with a base station and a variable-gain server antenna adapted to communicate with a mobile device. A signal from a selected base station selected from one or more available base stations that are available to the cellular repeater is measured at the donor antenna. The gain of the donor antenna is adapted to maximize a signal level of the signal received at the donor antenna from the selected base station. A calibration signal from the server antenna is measured at the donor antenna to determine a radio frequency isolation between the donor antenna and the server antenna. The gain of the server antenna is adapted to maximize the radio frequency isolation between the donor antenna and server antenna.

20 Claims, 7 Drawing Sheets

U.S. PATENT DOCUMENTS

| | | | |
|---|---|---|---|
| 2004/0001464 A1* | 1/2004 | Adkins et al. | 370/335 |
| 2004/0110469 A1* | 6/2004 | Judd et al. | 455/15 |
| 2004/0166802 A1* | 8/2004 | McKay et al. | 455/15 |
| 2004/0219876 A1* | 11/2004 | Baker et al. | 455/7 |
| 2005/0054312 A1* | 3/2005 | Spirito et al. | 455/226.1 |
| 2006/0205343 A1* | 9/2006 | Runyon et al. | 455/11.1 |
| 2006/0211378 A1* | 9/2006 | Gaal et al. | 455/69 |
| 2007/0010198 A1* | 1/2007 | McKay, Sr. | 455/10 |
| 2008/0182511 A1* | 7/2008 | Adkins et al. | 455/9 |
| 2008/0299897 A1* | 12/2008 | Mohebbi | 455/11.1 |
| 2009/0285147 A1* | 11/2009 | Subasic et al. | 370/315 |
| 2010/0159937 A1* | 6/2010 | Gaal et al. | 455/450 |

FOREIGN PATENT DOCUMENTS

| | | |
|---|---|---|
| JP | 11 251 987 | 9/1999 |
| WO | WO 2005025078 | 9/2003 |
| WO | WO 2005069249 | 1/2004 |

OTHER PUBLICATIONS

Written Opinion of International Searching Authority for related patent PCT/US2007/083831 performed by International Searching Authority/EP on Jul. 7, 2008.

Stevens, P.J., "Repeaters in PCN and Mobile Cellular Networks," Radio Receivers and Associated Systems, Sep. 26-28, 1995, Conference Publication No. 415, IEE 1995.

* cited by examiner

VARIABLE GAIN ANTENNA FOR CELLULAR REPEATER

CROSS REFERENCE TO RELATED APPLICATIONS

The present patent application claims priority under 35 U.S.C. §119 to U.S. Provisional Patent Application Ser. No. 60/864,570 filed on Nov. 6, 2006, and entitled, "Variable Gain Antenna For Cellular Repeater" the entire disclosure of which is incorporated by reference herein.

BACKGROUND

FIG. 1 illustrates a cellular repeater 100 having a donor antenna 102 adapted to communicate with one or more base stations 104, and a server antenna 106 adapted to communicate with a wireless device 108. Examples of the wireless device 108 include a cellular phone, laptop computer, desktop computer, or personal digital assistant (PDA). Thus, the cellular repeater 100 is suited for an environment such as a home or building, to receive signals from the selected base station 104, boost, or add gain to, the signals, and send the boosted signals to the wireless device 108, and back again from the wireless device 108 to the selected base station 104.

Cellular repeaters 100 usually require radio frequency (RF) isolation between the server and donor antennas, as a signal received by one antenna, to be amplified and transmitted by the other antenna, could return back into the first antenna to potentially cause instability and oscillations. The required RF isolation can be realized either by physical separation (i.e., path loss) between the antennas, or by making the antennas directional, providing a level of signal attenuation in the direction of the other antenna, or by a combination of both physical separation and directional separation techniques.

In a single-box repeater, where the donor and server antennas are both placed in a single enclosure 105, it is not possible to provide the RF isolation by distance (path loss) and therefore antenna directivity has to be used if an appreciable gain is to be realized by the repeater. While it may be possible to use two directional antennas in a single box facing opposite directions to provide some level of RF isolation, such use of directional antennas in a cellular network has adverse effects on network performance. For example, if a directional antenna is not being directed toward the right base station (also called Base Transceiver Station, or BTS) at the time, the antenna could communicate with a base station in which signal strength is suboptimum.

Further, if the antenna is not in the direction of the selected base station, the directionality property of the antenna can reduce the signal level to/from BTS (or MS), attenuating it beyond what is receivable by an omni-directional antenna. This causes excess loss due to the directionality of the antenna, degrading network performance.

SUMMARY

This document presents a cellular repeater and method of operating a cellular repeater, in which one or both of the donor and server antennas are incrementally adaptable to maximize radio frequency isolation between them, without impairing performance of the repeater. The donor and/or server antenna are preferably variable-gain directional antennas, and in some implementations include a multi-stage array of patch antennas.

In one aspect, a method of operating a cellular repeater having a variable-gain donor antenna adapted to communicate with a base station, and a server antenna adapted to communicate with a mobile device, includes measuring, at the donor antenna, a signal from a best serving base station selected from one or more available base stations that are available to the cellular repeater. The method further includes adapting the gain of the donor antenna to maximize a signal level of the signal received at the donor antenna from the selected base station.

In another aspect, a method of operating a cellular repeater having a donor antenna adapted to communicate with a base station, and a variable-gain server antenna adapted to communicate with a mobile device, includes measuring, at the donor antenna, a signal from the server antenna to determine a radio frequency isolation between the server antenna and the donor antenna. The method further includes adapting the gain of the server antenna to increase radio frequency isolation between the donor antenna and server antenna.

In yet another aspect, a method of operating a cellular repeater having a variable-gain donor antenna adapted to communicate with a base station and a variable-gain server antenna adapted to communicate with a mobile device, includes measuring, at the donor antenna, a signal from a selected base station selected from one or more available base stations that are available to the cellular repeater. The method further includes adapting the gain of the donor antenna to maximize a signal level of the signal received at the donor antenna from the selected base station, and measuring, at the donor antenna, a calibration signal from the server antenna to determine a radio frequency isolation between the donor antenna and the server antenna. The method further includes adapting the gain of the server antenna to maximize the radio frequency isolation between the donor antenna and server antenna.

In still yet another aspect, a cellular repeater includes a donor antenna configured to communicate with a base station, a server antenna configured to communicate with a mobile device, and a calibration signal receiver connected with the donor antenna to receive calibration signals transmitted from the server antenna. The system further includes a radio frequency isolation controller adapted to maximize radio frequency isolation between the donor antenna and the server antenna based on the received calibration signals without impairing a signal that is optimized for communication between the donor antenna and the base station.

The details of one or more embodiments are set forth in the accompanying drawings and the description below. Other features and advantages will be apparent from the description and drawings, and from the claims.

BRIEF DESCRIPTION OF THE DRAWINGS

These and other aspects will now be described in detail with reference to the following drawings.

DETAILED DESCRIPTION

This document describes cellular repeaters and methods of operating cellular repeaters, in which one or both of the donor and server antennas are incrementally adaptable to maximize radio frequency isolation between the donor and server antennas, without impairing performance of the cellular repeater. In preferred implementations, a variable gain antenna, with two or more gain increments, is used instead of a fixed gain antenna as the donor antenna and/or server antenna.

Figure 1:
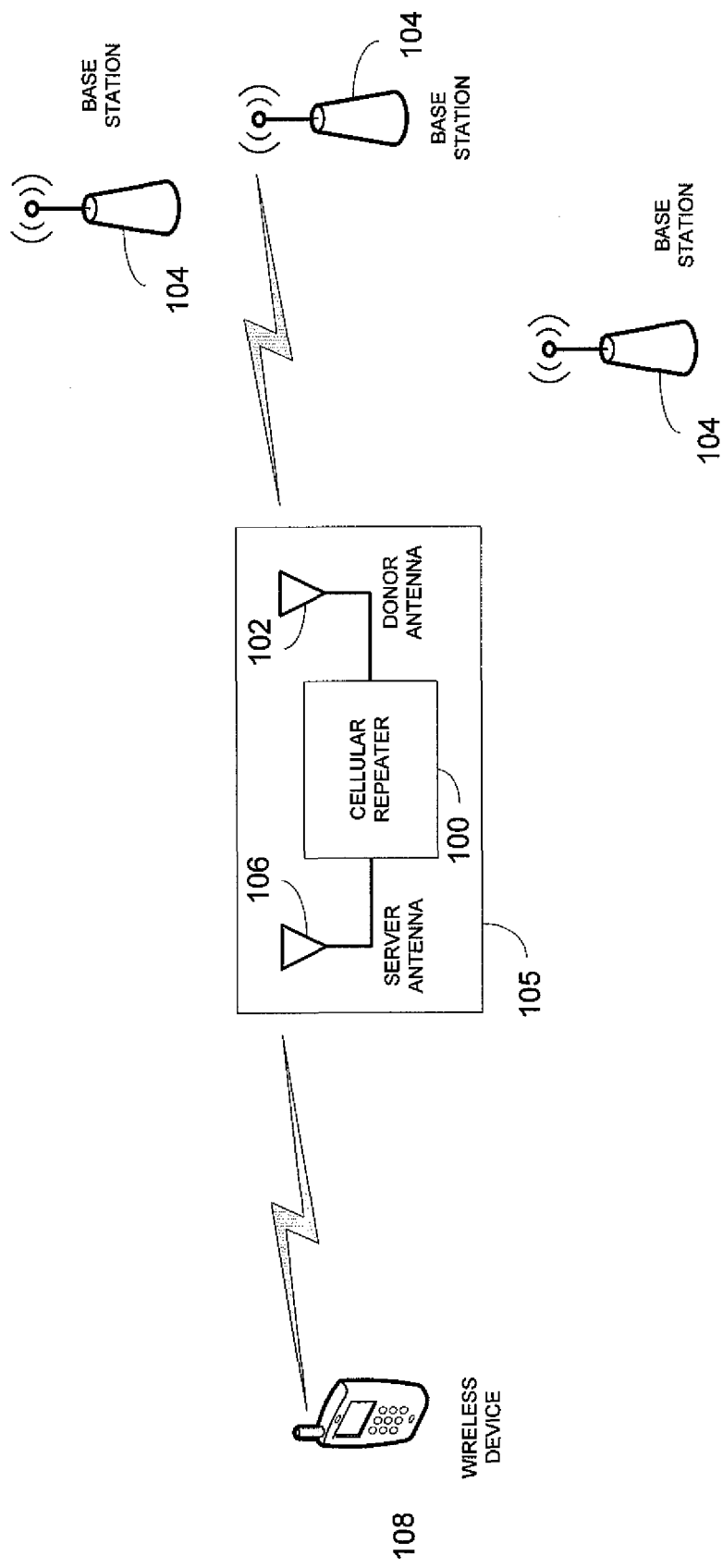
FIG. 1 illustrates a cellular repeater adapted for communication between one or base stations and one or mobile devices.
Figure 2:
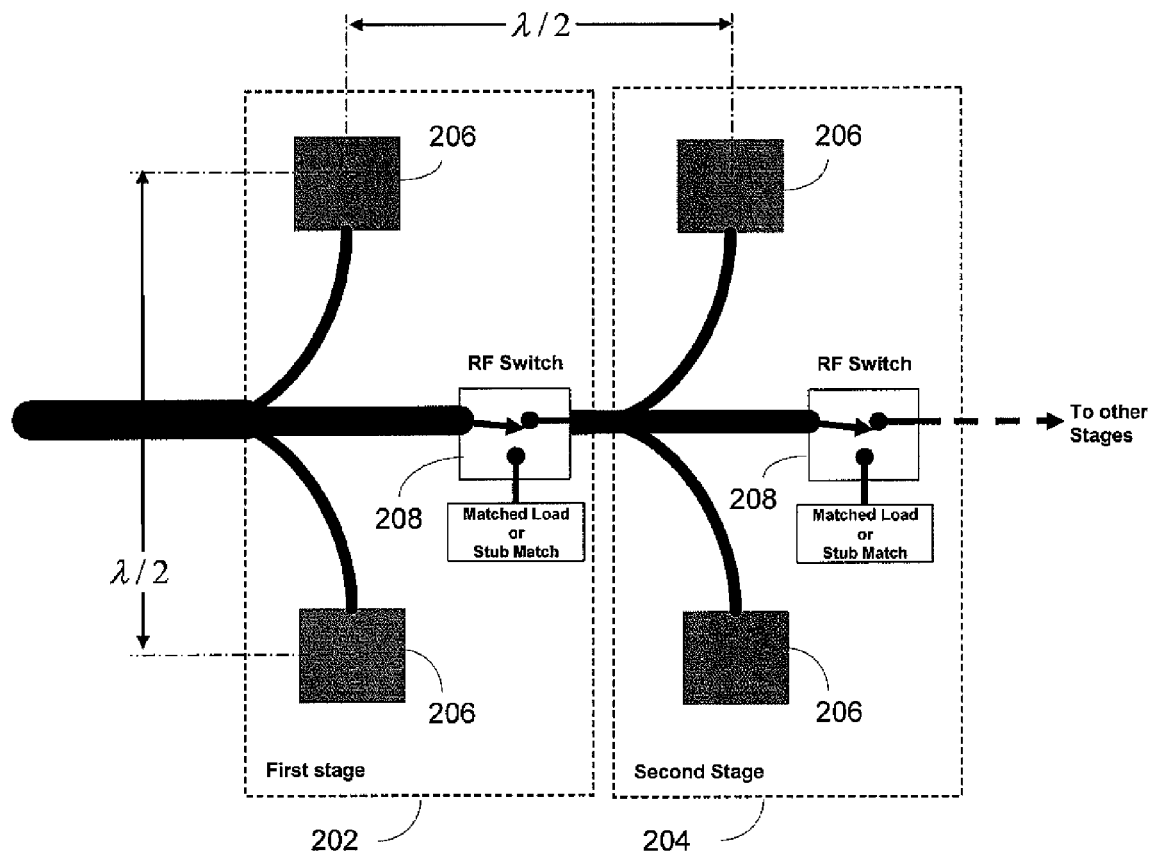
FIG. 2 depicts a variable-gain antenna based on a multi-stage array of patch antennas.

The donor and/or server antenna are preferably variable-gain directional antennas, and in some implementations include a multi-stage array of patch antennas. FIG. 2 depicts a variable-gain antenna 200 based on a multi-stage array of patch antennas, indicated by stages 204 and 206. Other stages are possible, and the multi-stage array can include an array of 2-10 or more antennas, each antenna including one or more radiating elements 206. An RF switch 208 is coupled between each pair of successive stages. Each RF switch 208 can be matched load or stub matched, and is activated according to an RF isolation controller that is adapted to maximize radio frequency isolation between the donor antenna and the server antenna based without impairing communications between the donor antenna and one or more base stations.

Figure 3:
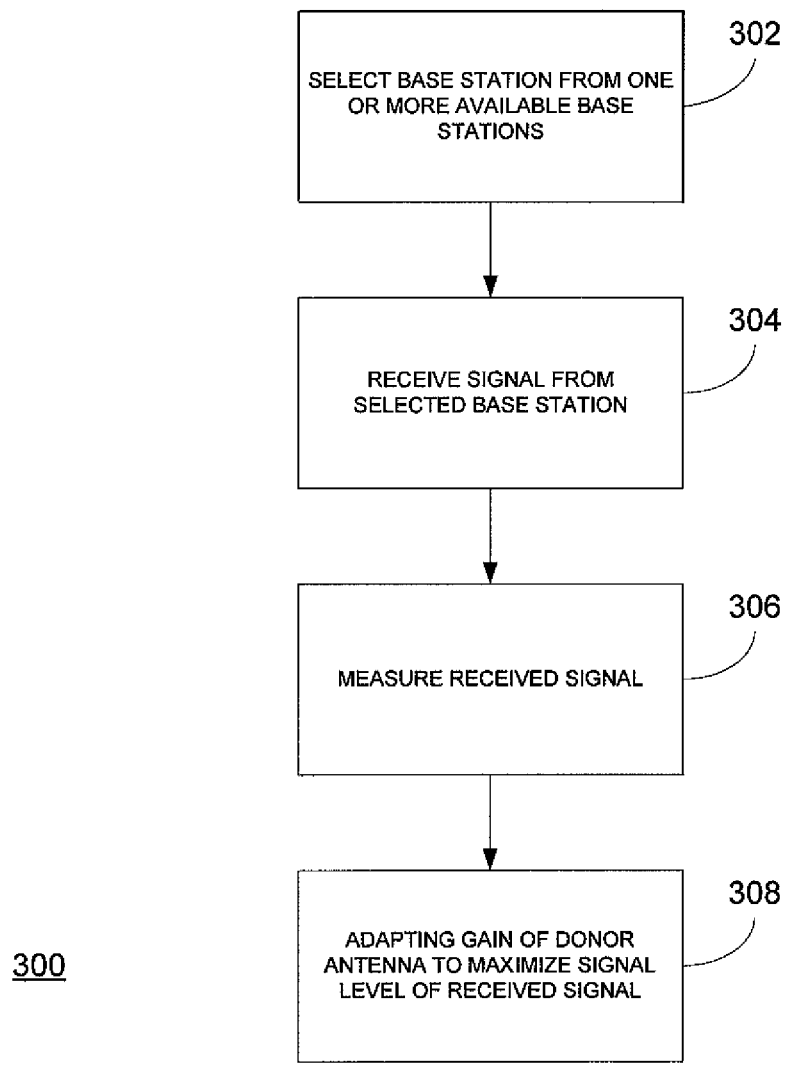
FIGS. 3 and 4 are flowcharts of various methods of operating a cellular repeater.

FIG. 3 is a flowchart of a method 300 of operating a cellular repeater having at least a variable-gain donor antenna adapted to communicate with a base station, and a server antenna adapted to communicate with a mobile device. At 302, the cellular repeater selects the best serving base station from one or more available base stations, preferably at the lowest possible gain setting of the donor antenna. The best serving base station can be the base station that provides the strongest signal, or in the presence of two or more equally strong signals, the cellular repeater merely selects one.

At 304, a signal is received from the selected base station, preferably at the lowest possible gain setting of the donor antenna, and at 306, the received signal is measured. The signal can be measured based on its received signal strength indicator (RSSI). The signal can be received and measured on a common control channel such as P-SCH if the communication with the base station is according to Wideband Code Division Multiple Access (WCDMA), or the broadcast control channel (BCCH) frequency if the system is operating according to the Global System for Mobile (GSM) communications standard.

At 308, the gain of the donor antenna is adapted to maximize a signal level of the signal received at the donor antenna from the selected base station. In some implementations, the gain of the donor antenna is increased by one increment, starting from its lowest gain setting, and the signal from the base station is received and measured at each gain increment. If the RSSI, or similar measurement, has been measured and recorded to have increased or remained the same, the gain is further incremented. If the RSSI or similar measurement has been measured and recorded to have decreased, the gain is decremented or reduced by one increment to the immediately preceding setting, and maintained there for operation.

Figure 4:
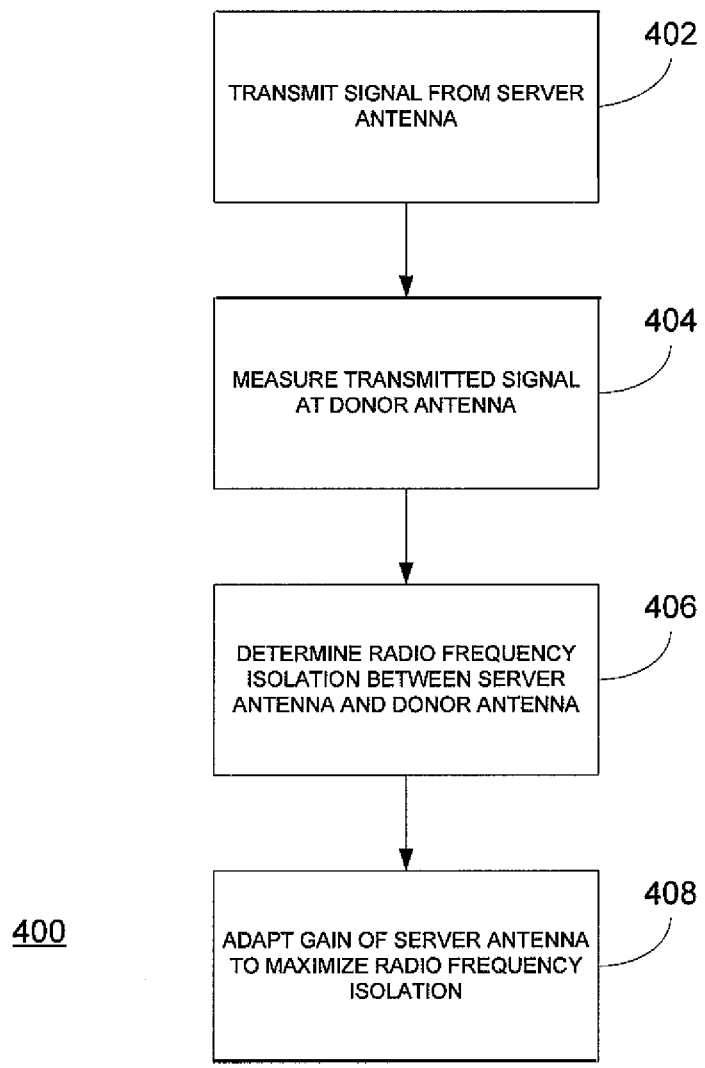

FIG. 4 is a flowchart of a method 400 of operating a cellular repeater having a donor antenna adapted to communicate with a base station, and at least a variable-gain server antenna adapted to communicate with a mobile device. At 402, a signal is transmitted from the server antenna. The signal is preferably a type of calibration signal, such as is described in Patent Appl. No. WO2005025078, filed Sep. 3, 2003, and Patent Appl. No. WO2005069249, filed Jan. 14, 2004, both to Mohebbi, that is transmitted via the server antenna on the downlink, and preferably at the server antenna's minimum gain setting. At 404, the signal is received at the donor antenna, preferably by the associated calibration signal receiver attached to the donor antenna, and measured.

At 406, a radio frequency signal isolation between the server antenna and donor antenna is determined. This can be performed by measuring and recording the RSSI of the received calibration signal. At 408, the gain of the server antenna is adapted so as to maximize the radio frequency isolation between the server antenna and the donor antenna, or otherwise at a point where the signal strength from the server antenna measured at the donor antenna is at a minimum for the incremental gain setting of the server antenna.

Figure 5:
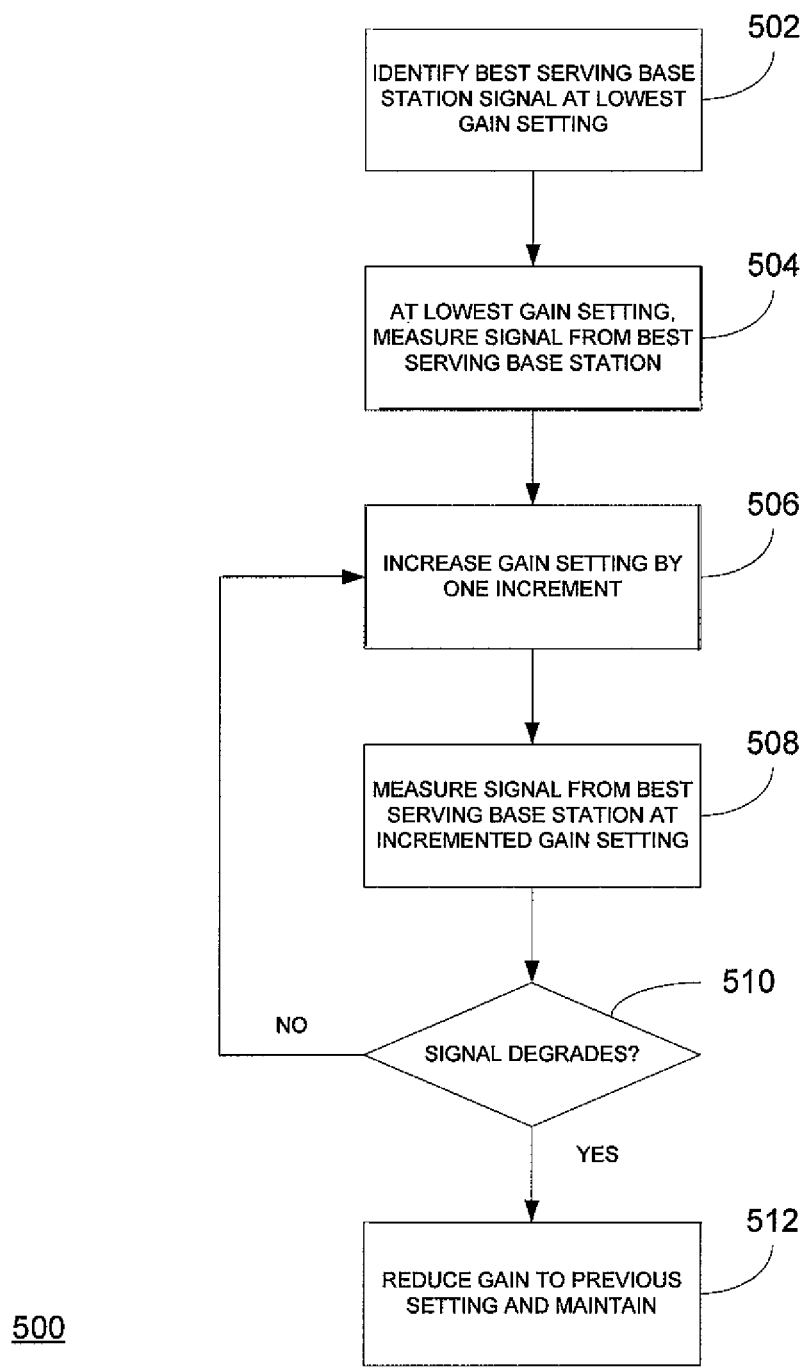
FIG. 5 is a flowchart of a method of operating a donor antenna of a cellular repeater.

FIG. 5 is a flowchart of a method 500 for operating a donor antenna of a cellular repeater. The cellular repeater includes the donor antenna, which is adapted to communicate with a base station, and a server antenna adapted to communicate with a mobile device. The method 500 can be executed when the cellular repeater is first installed in its location, after power on, before starting normal operation and transmission of signals from the donor or server antennas. The cellular repeater performs the following sequences, using the donor antenna for reception of a downlink cellular signal.

At 502, the best serving base station is identified and selected, based on a signal receivable by the donor antenna at its lowest antenna gain setting. For example, the best serving base station signal can include the best BCCH frequency if the system is GSM, or the strongest P-SCH if the system is WCDMA. At 504, at the lowest donor antenna gain setting, the RSSI of the received signal from the selected base station is measured and recorded. This can be performed on a common control channel such as P-SCH if WCDMA or BCCH frequency if GSM.

At 506, the antenna gain of the donor antenna is increased by one increment, and at 508 the RSSI of a new signal from the selected station is measured and recorded. At 510, it is determined whether the signal from the identified base station is degraded, or whether signal strength has increased or remained the same. If the signal has not degraded, the gain setting is increased by one increment at 506 and the RSSI of a new signal is measured and recorded at 508. If the signal has degraded, at 512 the gain is reduced to a previous setting and maintained for operation. The previous setting is preferably the immediate preceding gain setting of the donor antenna.

The method 500 ensures that the introduction of the gain in the donor antenna will not cause reduction in the received signal level (as a result of misalignment with any base station), and further sets the gain of the donor antenna to the optimum value for the particular geometrical setup of both the base station and the repeater.

Figure 6:
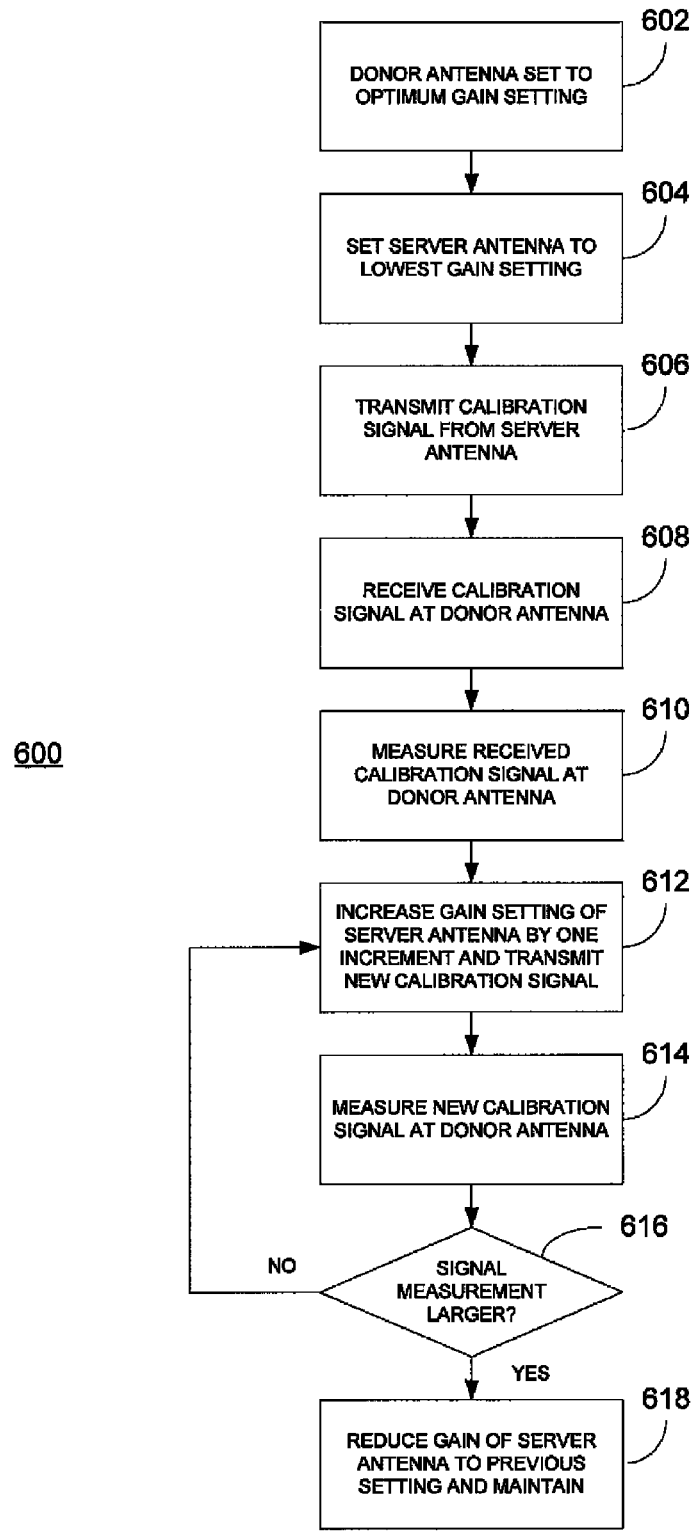
FIG. 6 is a flowchart of a method of operating a server antenna of a cellular repeater.

FIG. 6 is a flowchart of a method 600 for operating a server antenna of a cellular repeater. The cellular repeater includes the server antenna, which is adapted to communicate with a mobile device, and a donor antenna adapted to communicate with a base station, and the gain of which has preferably been set to an optimum setting according to method 500. Before the repeater is operational and any cellular signals are transmitted from either the donor or server antennas, the repeater performs the following sequences.

At 602, the donor variable gain antenna is set to the optimum gain setting (FIG. 5). At 604, the server antenna is set to its minimum gain setting, or its lowest gain setting. At 606, a calibration (channel sounding) signal, similar to the calibration signal described in Patent Appl. No. WO2005025078, filed Sep. 3, 2003, and Patent Appl. No. WO2005069249, filed Jan. 14, 2004, both to Mohebbi, is transmitted via the server antenna (on the down link). In some implementations, an associated calibration signal receiver is attached to the donor antenna. At 608, the calibration signal is received at the donor antenna, preferably by the calibration signal receiver.

At 610, the received calibration signal is measured at the donor antenna. This can be done with the calibration signal receiver attached to the donor antenna. The RSSI of the signal can be measured and recorded for the current gain setting of the server antenna. At 612, the gain setting of the server antenna is increased by one gain increment, and a new calibration signal is sent. At 614, the new calibration signal is received and measured at the donor antenna. The RSSI of the new calibration can be measured and recorded. At 616, a determination is made whether the new calibration signal at the current gain setting exceeds the previously received calibration signal at the lower gain setting. If not, the gain setting is further increased, preferably by one more gain setting, and the process continues at 612. If so, the gain setting of the server antenna is reduced, preferably to its immediate preceding gain setting, and maintained for operation at 618. The operations of the method 600 ensure optimum server antenna gain setting for maximum RF isolation between the server and donor antennas.

Figure 7:
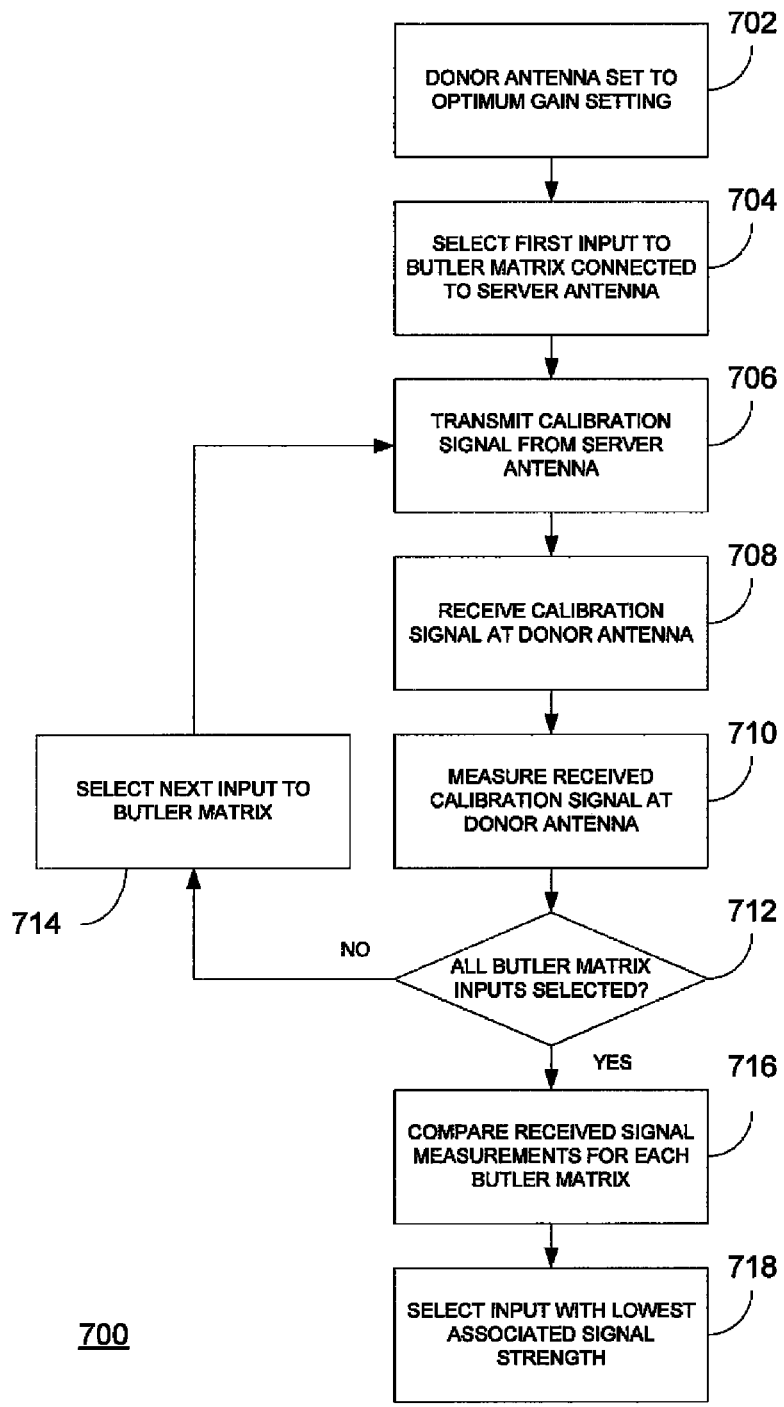
FIG. 7 is a flowchart of a method of operating a server antenna for a cellular repeater.

Alternately, instead of a variable-gain server antenna, a fixed gain antenna array connected to a Butler matrix with N degrees of freedom can be used, where N is the number of antennas, each having an input. FIG. 7 is a flowchart of a method 700 of operating a server antenna for a cellular repeater.

At 702, the donor variable gain antenna is set to the optimum gain setting (FIG. 5). At 704, the first input to the Butler matrix is selected. At 706, a calibration (channel sounding) signal, similar to the calibration signal described in Patent Appl. No. WO2005025078, filed Sep. 3, 2003, and Patent Appl. No. WO2005069249, filed Jan. 14, 2004, both to Mohebbi, is transmitted via the server antenna (on the down link). In some implementations, an associated calibration signal receiver is attached to the donor antenna. At 708, the calibration signal is received at the donor antenna, preferably by the calibration signal receiver. At 710, the received calibration signal is measured at the donor antenna. This can be done with the calibration signal receiver attached to the donor antenna. The RSSI of the signal can be measured and recorded for the current gain setting of the server antenna.

At 712, it is determined whether all Butler matrix inputs have been selected. If not, at 714, the next input to the Butler matrix is selected, and the method 700 repeats at 706 with the transmission, receipt, and measurement of a next calibration signal. If all inputs to the Butler matrix have been selected, at 716 the received signal measurements for each input are compared. At 718, the input associated with the lowest associated signal strength is selected, and the server antenna is configured for operation.

Although a few embodiments have been described in detail above, other modifications are possible. The logic flows depicted in FIGS. 3-7 do not require the particular order shown, or sequential order, to achieve desirable results. Other embodiments may be within the scope of the following claims.

What is claimed:

1. A method of operating a cellular repeater having a variable-gain donor antenna adapted to communicate with a base station, and a server antenna adapted to communicate with a mobile device, the method comprising:

receiving, at the donor antenna, communications from one or more available base stations that are available to the cellular repeater;

determining a best serving base station from the one or more available base stations;

measuring, at the donor antenna, a signal from the best serving base station;

adapting a gain of the donor antenna to maximize a signal level of the signal received at the donor antenna from the best serving base station; and adapting a gain of the server antenna to increase a radio frequency isolation between the donor antenna and the server antenna, the adapting of the gain of the server antenna including incrementally increasing the gain of the server antenna until the radio frequency isolation between the donor antenna and the server antenna degrades.

2. The method of claim 1, wherein adapting the gain of the donor antenna includes:

incrementally increasing the gain of the donor antenna until a signal strength of the signal received at the donor antenna from the best serving base station decreases.

3. The method of claim 1, wherein measuring the signal from the best serving base station includes:

recording a received signal strength indicator associated with the signal.

4. The method of claim 1, wherein the server antenna is variable-gain.

5. A method of operating a cellular repeater having a donor antenna adapted to communicate with a base station, and a variable-gain server antenna adapted to communicate with a mobile device, the method comprising:

receiving, at the donor antenna, a signal transmitted from the server antenna;

measuring, at the donor antenna, the signal from the server antenna to determine a radio frequency isolation between the server antenna and the donor antenna; and adapting a gain of the server antenna based on the measured signal to increase radio frequency isolation between the donor antenna and server antenna, the adapting of the gain of the server antenna including incrementally increasing the gain of the server antenna until the radio frequency isolation between the donor antenna and the server antenna degrades.

6. The method of claim 5, further comprising optimizing the gain of the donor antenna for communication with a selected base station selected from one or more available base stations.

7. A method of operating a cellular repeater having a donor antenna adapted to communicate with a base station, and a variable-gain server antenna adapted to communicate with a mobile device, the method comprising:

receiving, at the donor antenna, a signal transmitted from the server antenna;

measuring, at the donor antenna, the signal from the server antenna to determine a radio frequency isolation between the server antenna and the donor antenna;

adapting a gain of the server antenna based on the measured signal to increase radio frequency isolation between the donor antenna and server antenna; and optimizing the gain of the donor antenna for communication with a selected base station selected from one or more available base stations, wherein the donor antenna is variable-gain, and wherein optimizing the gain of the donor antenna includes incrementally increasing the gain of the donor antenna until a signal strength of the signal received at the donor antenna from the selected base station decreases.

8. The method of claim 5, wherein the signal from the server antenna is a calibration signal transmitted from the server antenna.

9. A method of operating a cellular repeater having a variable-gain donor antenna adapted to communicate with a base station and a variable-gain server antenna adapted to communicate with a mobile device, the method comprising:
   measuring, at the donor antenna, a signal received from each of one or more available base stations that are available to the cellular repeater;
   adapting a gain of the donor antenna to maximize a signal level of the signal received at the donor antenna from a selected base station from the one or more available base stations;
   measuring, at the donor antenna, a calibration signal transmitted from the server antenna and received by the donor antenna to determine a radio frequency isolation between the donor antenna and the server antenna; and
   adapting a gain of the server antenna to maximize the radio frequency isolation between the donor antenna and server antenna.

10. The method of claim 9, wherein adapting the gain of the donor antenna to maximize a signal level of the signal received at the donor antenna from the selected base station includes:
   incrementally increasing the gain of the donor antenna until a signal strength of the signal received at the donor antenna from the selected base station decreases.

11. The method of claim 9, adapting the gain of the server antenna to maximize the radio frequency isolation between the donor antenna and server antenna includes incrementally increasing the gain of the server antenna until the radio frequency isolation between the donor antenna and the server antenna degrades.

12. The method of claim 9, wherein the radio frequency isolation is measured by, and inversely proportional to, a received signal strength of the calibration signal.

13. A cellular repeater comprising:
   a donor antenna configured to communicate with a selected base station selected from a plurality of base stations;
   a server antenna configured to communicate with a mobile device;
   a calibration signal receiver connected with the donor antenna to receive calibration signals transmitted from the server antenna; and
   a radio frequency isolation controller adapted to maximize radio frequency isolation between the donor antenna and the server antenna based on the received calibration signals without impairing a signal that is optimized for communication between the donor antenna and the base station.

14. The cellular repeater of claim 13, wherein the radio frequency isolation controller is further adapted to measure a signal received at the donor antenna from the base station, and adapt the gain of the donor antenna to maximize a signal level of the signal received at the donor antenna from the base station, and
   wherein the selected base station based on a signal that is stronger than signals provided by other base stations of the plurality of base stations.

15. The cellular repeater of claim 13, wherein the radio frequency isolation controller is further adapted to measure a calibration signal received by the calibration signal receiver from the server antenna to determine a radio frequency isolation between the donor antenna and the server antenna, and adapt the gain of the server antenna to maximize the radio frequency isolation between the donor antenna and server antenna.

16. The cellular repeater of claim 13, wherein the donor antenna includes a multi-stage array of patch antennas providing a variable gain.

17. The cellular repeater of claim 13, wherein the server antenna includes a multi-stage array of patch antennas.

18. The cellular repeater of claim 16, wherein the multi-stage array of patch antennas includes a radio frequency switch coupled between each consecutive stage of the multi-stage array, each stage of the multi-stage array comprising a plurality of radiating elements, the radio frequency switch being responsive to the radio frequency isolation controller to incrementally activate successive stages to adapt the gain of the donor antenna.

19. The cellular repeater of claim 17, wherein the multi-stage array of patch antennas includes a radio frequency switch coupled between each stage, and which is responsive to the radio frequency isolation controller to incrementally activate successive stages to adapt the gain of the donor antenna.

20. The method of claim 7, wherein the signal from the server antenna is a calibration signal transmitted from the server antenna.

* * * * *

UNITED STATES PATENT AND TRADEMARK OFFICE
CERTIFICATE OF CORRECTION

| | | |
|---|---|---|
| PATENT NO. | : 8,447,230 B2 | Page 1 of 1 |
| APPLICATION NO. | : 11/936040 | |
| DATED | : May 21, 2013 | |
| INVENTOR(S) | : Behzad B. Mohebbi | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 707 days.

Signed and Sealed this
Twenty-fifth Day of August, 2015

Michelle K. Lee
*Director of the United States Patent and Trademark Office*